(12) United States Patent
Kim et al.

(10) Patent No.: US 10,477,564 B2
(45) Date of Patent: Nov. 12, 2019

(54) SCHEDULING METHOD AND APPARATUS

(71) Applicant: INDUSTRY-ACADEMIC COOPERATION FOUNDATION, YONSEI UNIVERSITY, Seoul (KR)

(72) Inventors: Kwang-Soon Kim, Seoul (KR); Kyung Jun Choi, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 126 days.

(21) Appl. No.: 15/619,450

(22) Filed: Jun. 10, 2017

(65) Prior Publication Data
US 2017/0367105 A1 Dec. 21, 2017

(30) Foreign Application Priority Data
Jun. 15, 2016 (KR) ........................ 10-2016-0074414

(51) Int. Cl.
*H04W 72/12* (2009.01)
*H04W 52/14* (2009.01)
*H04W 52/24* (2009.01)
*H04W 52/42* (2009.01)
*H04W 72/04* (2009.01)
(Continued)

(52) U.S. Cl.
CPC ....... *H04W 72/121* (2013.01); *H04W 52/146* (2013.01); *H04W 52/241* (2013.01); *H04W 52/247* (2013.01); *H04W 52/42* (2013.01); *H04W 72/0413* (2013.01); *H04W 72/1231* (2013.01); *H04W 72/1236* (2013.01);
(Continued)

(58) Field of Classification Search
None
See application file for complete search history.

(56) References Cited

U.S. PATENT DOCUMENTS

2002/0177447 A1* 11/2002 Walton ................ H04B 7/0417
455/452.1
2004/0042435 A1* 3/2004 Soomro ............ H04W 72/1289
370/338
(Continued)

FOREIGN PATENT DOCUMENTS

KR 10-2004-0016066 A 2/2004
KR 10-2009-0026185 A 3/2009
KR 10-2009-0053918 A 5/2009

*Primary Examiner* — Alex Skripnikov
*Assistant Examiner* — Sharmin Chowdhury

(57) ABSTRACT

A scheduling apparatus and method are disclosed. An embodiment of the invention provides a scheduling apparatus that includes: a scheduling group classification unit that classifies user terminals located within a serving cell of a base station into a multiple number of scheduling groups by using large-scale fading information of the user terminals; a transmission power setting unit that sets the transmission power of the user terminals for each of the classified scheduling groups; a scheduling period setting unit that sets the scheduling period for each of the scheduling groups by determining a resource element usage proportion for each of the scheduling groups based on the data rate of each of the scheduling groups and determining the data rate expected for all user terminals; and a resource element allocation unit that allocates resource elements used for each of the scheduling groups according to each of the determined scheduling periods.

17 Claims, 15 Drawing Sheets

(51) Int. Cl.
*H04B 7/0452* (2017.01)
*H04L 5/00* (2006.01)

(52) U.S. Cl.
CPC ... *H04W 72/1268* (2013.01); *H04W 72/1289* (2013.01); *H04B 7/0452* (2013.01); *H04L 5/0007* (2013.01)

(56) References Cited

U.S. PATENT DOCUMENTS

| | | | | |
|---|---|---|---|---|
| 2004/0179525 | A1* | 9/2004 | Balasubramanian | H04W 28/22 370/391 |
| 2008/0002646 | A1* | 1/2008 | Hannu | H04W 72/1231 370/338 |
| 2008/0207150 | A1* | 8/2008 | Malladi | H04W 52/08 455/127.1 |
| 2011/0310833 | A1* | 12/2011 | Lee | H04L 1/1829 370/329 |
| 2014/0313956 | A1* | 10/2014 | Ansari | H04W 52/0206 370/311 |
| 2015/0085805 | A1 | 3/2015 | Li et al. | |
| 2015/0092768 | A1* | 4/2015 | Ng | H04W 48/16 370/350 |
| 2015/0156786 | A1* | 6/2015 | Kim | H04B 7/0452 370/329 |
| 2016/0057736 | A1* | 2/2016 | Jung | H04W 74/06 370/329 |
| 2017/0338876 | A1* | 11/2017 | Moosavi | H04B 7/0456 |

* cited by examiner

SCHEDULING METHOD AND APPARATUS

CROSS-REFERENCE TO RELATED APPLICATIONS

This application claims the benefit of Korean Patent Application No. 10-2016-0074414, filed with the Korean Intellectual Property Office on Jun. 15, 2016, the disclosure of which is incorporated herein by reference in its entirety.

BACKGROUND

1. Technical Field

The present invention relates to a scheduling method and apparatus, more particularly to scheduling that can reduce delays that may occur during the transmission of data in a mobile communication system of a massive MIMO environment that supports uplink multi-user transmission.

2. Description of the Related Art

In conventional mobile communication systems, including those that use LTE (long-term evolution), predicting the performance of a channel between a user terminal and a base station antenna can be very difficult or very inaccurate, due to channel fluctuations between the user terminal and the base station antenna.

In such an environment, it is crucial that user scheduling first performs the process of acquiring accurate channel information if the user is to be guaranteed high quality of service, and due to the inherent property of the channel changing within short durations of time in a mobile communication environment, a process of transmitting reference signals in short periods for the scheduling is inevitably required.

FIG. 1 is a flow diagram illustrating a user scheduling procedure according to the related art.

Incidentally, the procedure in FIG. 1 can apply to the cases of an uplink and to a TDD (time-division duplexing) downlink.

In FIG. 1, user terminals desiring scheduling may transmit reference signals (RS) agreed upon beforehand with the base station over an uplink (operation S101).

Here, the number of reference signals needed and the corresponding number of resource elements (RE) would be proportional to the number of user terminals desiring scheduling.

Incidentally, in the case of FDD (frequency-division duplexing), the base station transmits reference signals via downlinks, and thus the number of resource elements would increase in proportion to the number of antennas at the base station.

After operation S101, the base station may estimate the channel information of the user terminals by using the reference signals received from the user terminals, and may perform user scheduling based on the channel information (operation S102).

After operation S102, the base station may transmit control signals for the user terminals, of which scheduling has been determined, via a PDCCH (physical downlink control channel) (operation S103).

Here, the scheduling information transmitted to the user terminals can include the indexes of the scheduled user terminals, positions of the scheduled resource elements, uplink transmission power, etc.

After operation S103, the user terminals may transmit data signals over uplinks according to the scheduling information received from the base station (operation S104).

After operation S104, the base station may decide whether or not to perform a hybrid ARQ (automatic repeat request) according to whether or not the data signals received from the user terminals were properly decoded (operation S105).

With this type of scheduling scheme based on the related art, many uplink reference signals may be needed, since the uplink reference signals are transmitted before the scheduling, and consequently the spectral efficiency of the overall system may be decreased.

Also, since the uplink reference signals are transmitted before the scheduling, the channel information of user terminals for which scheduling was not performed is either not retained or not utilized, resulting in lowered energy efficiency of the user terminals.

Moreover, as the transmissions follow the sequence of uplink→downlink→uplink, there may occur two uplink/downlink transmission conversions, which may cause considerable delays in the context of TDD (time-division duplexing) or FDD (frequency-division duplexing).

SUMMARY OF THE INVENTION

To resolve the problems in the related art described above, an aspect of the invention aims to provide a way to schedule multiple resource elements at once in a massive MIMO environment without having to acquire reference signals or channel information for the scheduling.

Also, an aspect of the invention aims to provide a grant-free multiple access system that supports low-latency high-reliability services by using such scheduling.

To achieve the objectives above, an embodiment of the invention provides a scheduling apparatus that includes: a scheduling group classification unit configured to classify user terminals located within a serving cell of a base station into a multiple number of scheduling groups by using large-scale fading information of the user terminals; a transmission power setting unit configured to set a transmission power of the user terminals for each of the classified scheduling groups; a scheduling period setting unit configured to set a scheduling period for each of the scheduling groups by determining a resource element usage proportion for each of the scheduling groups based on a data rate of each of the scheduling groups and determining a data rate expected for all user terminals; and a resource element allocation unit configured to allocate a number of resource elements used for each of the scheduling groups according to each of the determined scheduling periods.

To achieve the objectives above, an embodiment of the invention provides a scheduling method for a scheduling apparatus that includes: (a) classifying user terminals located within a serving cell of a base station into a multiple number of scheduling groups by using large-scale fading information of the user terminals; (b) setting a transmission power of the user terminals for each of the classified scheduling groups; (c) setting a scheduling period for each of the scheduling groups by determining a resource element usage proportion for each of the scheduling groups based on a data rate of each of the scheduling groups and determining a data rate expected for all user terminals; and (d) allocating a number of resource elements used for each of the scheduling groups according to each of the determined scheduling periods.\

To achieve the objectives above, an embodiment of the invention provides a user terminal that communicates with a base station according to a scheduling by the base station and includes a processor, a memory connected to the processor, and a communication unit connected to the processor, where the memory stores program instructions executable by the processor for performing the procedures of: transmitting a physical uplink shared channel (PUSCH) signal to the base station by way of the communication unit, deciding whether or not to use an allocated resource element upon receiving scheduling information from the base station by way of the communication unit, where the scheduling information includes information on the scheduling group to which the user terminal belongs and the resource element and transmission power allocated to the scheduling group, and transmitting a reference signal and a data signal to the base station with the allocated transmission power by using the allocated resource element, together with other user terminals belonging to the scheduling group according to the received scheduling information, if as a result of the deciding it is decided that the allocated resource element is to be used. Here, the scheduling information is generated based on large-scale fading information acquired by the base station by using the physical uplink shared channel signal.

To achieve the objectives above, an embodiment of the invention provides a method by which a user terminal communicates with a base station according to a scheduling by the base station, where the method includes: (a) transmitting a physical uplink shared channel (PUSCH) signal to the base station; (b) receiving scheduling information from the base station, where the scheduling information includes information on the scheduling group to which the user terminal belongs and the resource element and transmission power allocated to the scheduling group; and (c) transmitting a reference signal and a data signal to the base station with the allocated transmission power by using the allocated resource element, together with other user terminals belonging to the scheduling group, according to the received scheduling information. Here, the scheduling information is generated based on large-scale fading information acquired by the base station by using the physical uplink shared channel signal.

According to an embodiment of the invention, the procedure of transmitting reference signals in short periods for scheduling is no longer necessary.

Also, delays caused by repeated uplinks and downlinks can be reduced.

Also, the system's spectral efficiency and the user terminals' energy efficiency can be enhanced, as no user terminal is left unscheduled from among the user terminals located within a serving cell.

Moreover, a grant-free system can be provided that is able to support low-latency high-reliability services even without immediate channel state information (CSI) or channel quality information (CQI).

Additional aspects and advantages of the present invention will be set forth in part in the description and scope of claims, and in part will be obvious from the description and scope of claims, or may be learned by practice of the invention.

DETAILED DESCRIPTION OF THE INVENTION

Figure 1:
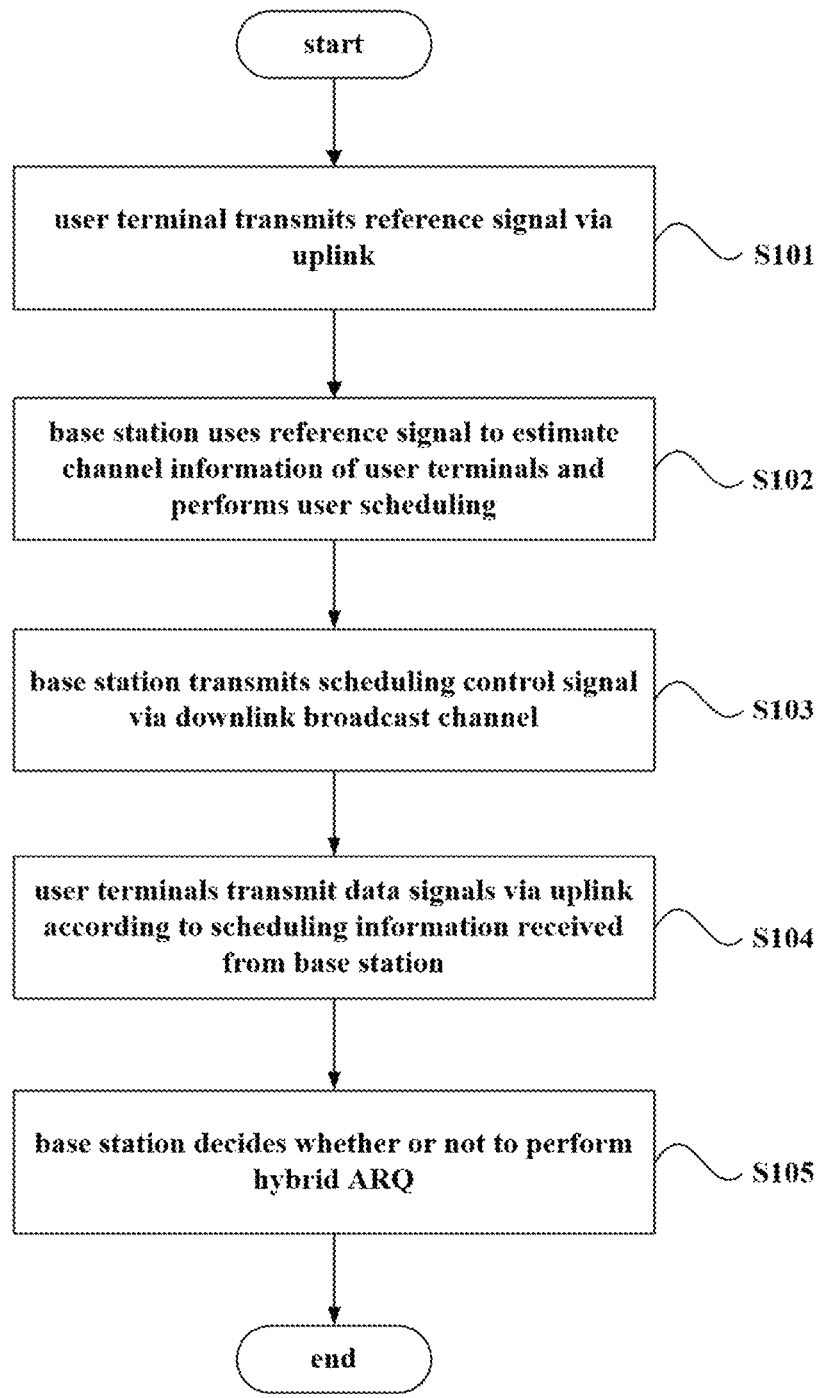
FIG. 1 is a flow diagram illustrating a user scheduling procedure according to the related art.

Certain embodiments of the present invention will be described below in more detail with reference to the accompanying drawings. However, the invention can be implemented in various different forms and hence is not limited to the embodiments described herein.

For a clear description of the invention, certain parts that are not directly relevant to the invention have been omitted in the drawings. Throughout the specification overall, like reference numerals have been assigned to like portions.

In the specification, mention of a part being "connected" to another part not only refers to the two parts being "directly connected" but also encompasses those cases where the two parts are "indirectly connected," for example with one or more other members positioned in-between.

Also, mention of a part "including" an element should be interpreted as meaning that other elements can also be included and does not preclude the presence of other elements, unless explicitly stated otherwise.

A detailed description of certain embodiments of the present invention is provided below in more detail with reference to the accompanying drawings.

Figure 2A:
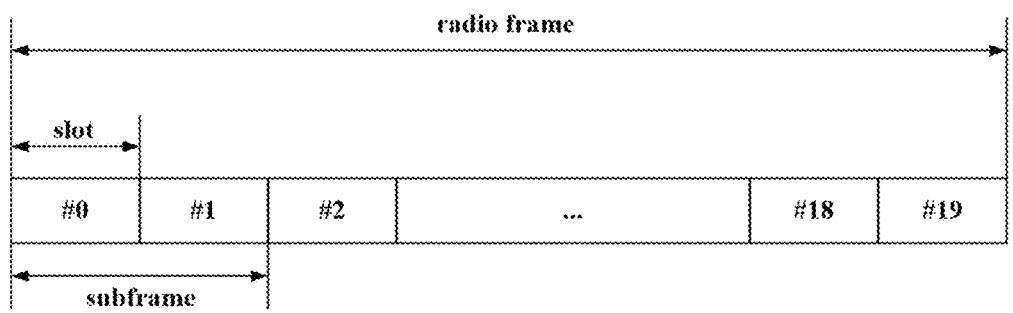
FIG. 2A and FIG. 2B are diagrams illustrating the structure of a wireless frame.
Figure 2B:
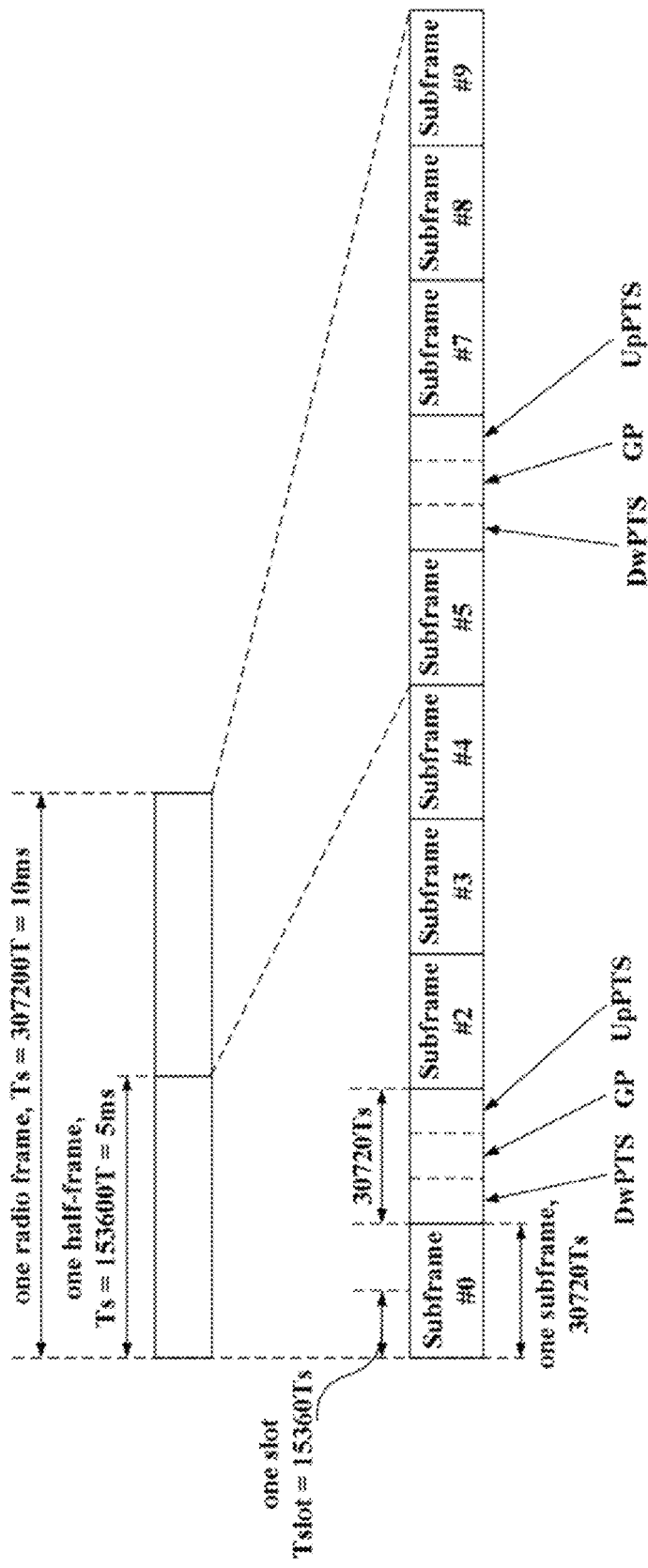

FIG. 2A and FIG. 2B are diagrams illustrating the structure of a wireless frame.

In an OFDM wireless packet communication system, an uplink/downlink data packet transmission may be performed at the subframe level, where one subframe is defined as a certain time segment that includes several OFDM symbols.

The 3GPP LTE standard supports the type-1 radio frame structure, which is applicable to FDD (frequency-division duplexing), and the type-2 radio frame structure, which is applicable to TDD (time-division duplexing).

FIG. 2A illustrates the structure of the type-1 radio frame.

A downlink radio frame may be composed of ten subframes, while one subframe may be composed of two slots. The time spent in transmitting one subframe may be referred to as the TTI (transmission time interval); for example, the length of one subframe can be 1 ms, and the length of one slot can be 0.5 ms.

One slot may include multiple OFDM symbols in the time domain and may include multiple resource blocks (RB) in the frequency domain.

The number of OFDM symbols included in one slot can differ according to the configuration of the CP (cyclic prefix).

Types of CP may include the extended CP and the normal CP.

For example, if an OFDM symbol is configured with a normal CP, then the number of OFDM symbols included in one slot can be seven.

Also, if an OFDM symbol is configured with an extended CP, then the length of one OFDM symbol may be longer, so that the number of OFDM symbols included in one slot may be smaller than the case with the normal CP.

In the case of an extended CP, the number of OFDM symbols included in a slot can be six, for example, and in cases where the state of the channel is unstable, such as when the terminal is moving at a fast speed, etc., an extended CP can be used to further reduce interference between symbols.

Since a slot includes seven OFDM symbols in cases where a normal CP is used, one subframe may include fourteen OFDM symbols.

Here, the first two or three OFDM symbols of each subframe can be allocated to a PDCCH (physical downlink control channel), while the remaining OFDM symbols can be allocated to a PDSCH (physical downlink shared channel).

FIG. 2B illustrates the structure of a type-2 radio frame.

The type-2 radio frame may be composed of two half-frames, with each half-frame composed of five subframes.

The subframes can be classified into normal subframes and special subframes.

A special subframe may be a subframe that includes the three fields of DwPTS (downlink pilot time slot), GP (gap period), and UpPTS (uplink pilot time slot).

While the lengths of these three fields can be set individually, the total length of the three fields have to be 1 ms.

A subframe may be composed of two slots. That is, regardless of the type of radio frame, one subframe is composed of two slots.

The structure of a radio frame described above is an example, and the number of subframes included in a radio frame, the number of slots included in a subframe, or the number of symbols included in a slot can vary in different examples.

Figure 3:
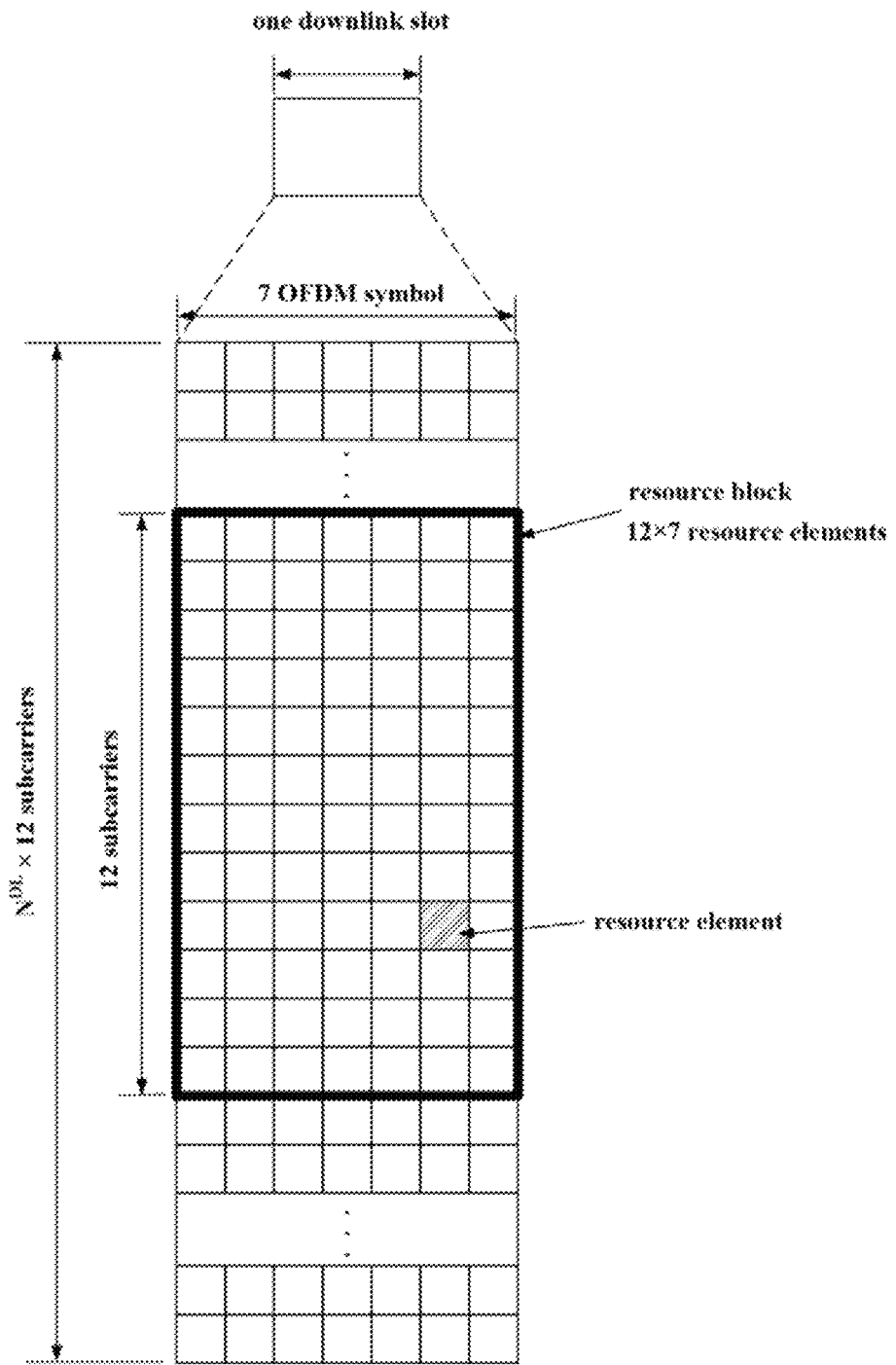
FIG. 3 is a diagram illustrating a resource grid for a downlink slot.

FIG. 3 is a diagram illustrating a resource grid for a downlink slot.

Incidentally, FIG. 3 shows an example in which the OFDM symbols are configured with a normal CP.

Referring to FIG. 3, a downlink slot may include multiple OFDM symbols in the time domain and include multiple resource blocks in the frequency domain.

In one example, one downlink slot can include seven OFDM symbols, and one resource block can include twelve subcarriers.

Of course, the number of OFDM symbols included in a downlink slot, the number of resource blocks, and the number of subcarriers can vary in different examples.

Each element on the resource grid may be referred to as a resource element.

For example, the resource element a(k, l) would be the resource element located at the k-th subcarrier and the l-th OFDM symbol.

A resource block may include 12×7 resource elements in the case of a normal CP and 12×6 resource elements in the case of an extended CP.

Since the interval between each subcarrier is 15 kHz, a resource block may include approximately 180 kHz in the frequency domain.

$N^{DL}$ represents the number of resource blocks included in a downlink slot, where the value of $N^{DL}$ can be determined according to the downlink transmission bandwidth configured by the scheduling at the base station.

Figure 4:
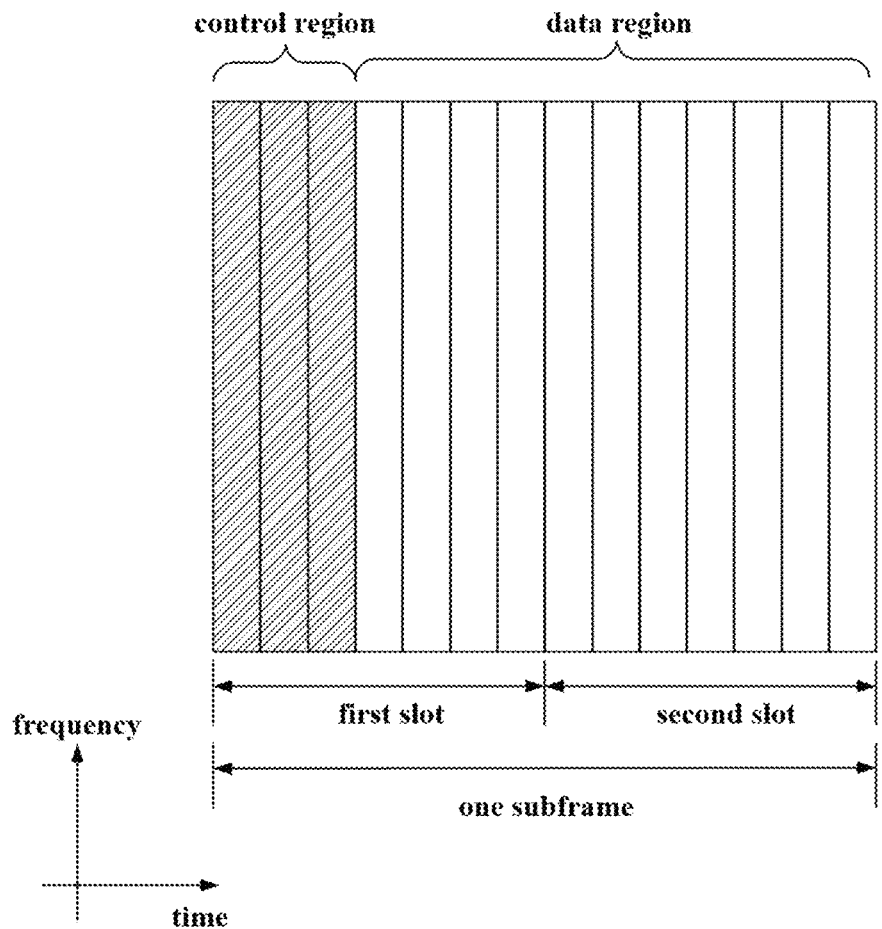
FIG. 4 is a diagram illustrating the structure of a downlink subframe.

FIG. 4 is a diagram illustrating the structure of a downlink subframe.

The front portion of the first slot, up to a maximum of three OFDM symbols, within a subframe may correspond to the control region, to which a control channel is allocated.

The remaining OFDM symbols may correspond to the data region, to which a physical downlink shared channel (PDSCH) is allocated.

The basic unit of transmission may be one subframe. That is, the PDCCH and PDSCH may be allocated over two slots.

Types of downlink control channels used in a 3GPP LTE system may include, for example, the physical control format indicator channel (PCFICH), physical downlink control channel (PDCCH), physical hybrid automatic repeat request (HARQ) indicator channel (PHICH), etc.

The PCFICH may be transmitted through the first OFDM symbol of a subframe and may include information on the number of OFDM symbols that are used for the control channel transmission within the subframe.

The PHICH may be a response to an uplink transmission and may include a HARQ ACK/NACK signal.

The control information transmitted via the PDCCH may be referred to as downlink control information (DCI).

DCI may include uplink or downlink scheduling information or include an uplink transmission power control command for an arbitrary group of terminals.

The PDCCH can include resource allocation and transmission format of the downlink share channel (DL-SCH), resource allocation information of the uplink share channel (UL-SCH), paging information of the paging channel (PCH), system information on the DL-SCH, resource allocation for an upper layer control massage such as a random access response transmitted over the PDSCH, a set of transmission power control commands for an individual terminal in an arbitrary terminal group, transmission power control information, activation of VoIP (voice over IP), etc.

A multiple number of PDCCH can be transmitted in the control region, and the terminal can monitor the multiple PDCCH.

The PDCCH may be transmitted as a combination of one or more consecutive control channel elements (CCE).

Here, a CCE is a unit of logic allocation used for providing the PDCCH at a coding rate based on a radio channel.

The CCE may correspond to a multiple number of resource element groups, and the format and usable number of bits of the PDCCH may be determined depending on the correlation between the number of CCE's and the coding rate provided by the CCE's.

The base station may determine the PDCCH format according to the DCI transmitted to the user terminal, and may add a cyclic redundancy check (CRC).

Here, the CRC may be masked with an identifier known as a radio network temporary identifier (RNTI) according to the owner or usage of the PDCCH.

If the PDCCH is for a particular terminal, the CRC can be masked with a cell-RNTI (C-RNTI) of the terminal.

Alternatively, if the PDCCH is for a paging message, the CRC can be masked with a paging indicator identifier (P-RNTI).

If the PDCCH is for system information (more specifically, a system information block (SIB)), the CRC can be masked with a system information identifier and system information RNTI (SI-RNTI).

In order to represent a random access response, which is a response by the user terminal to the transmission of a random access preamble, the CRC can be masked with a random access RNTI (RA-RNTI).

Figure 5:
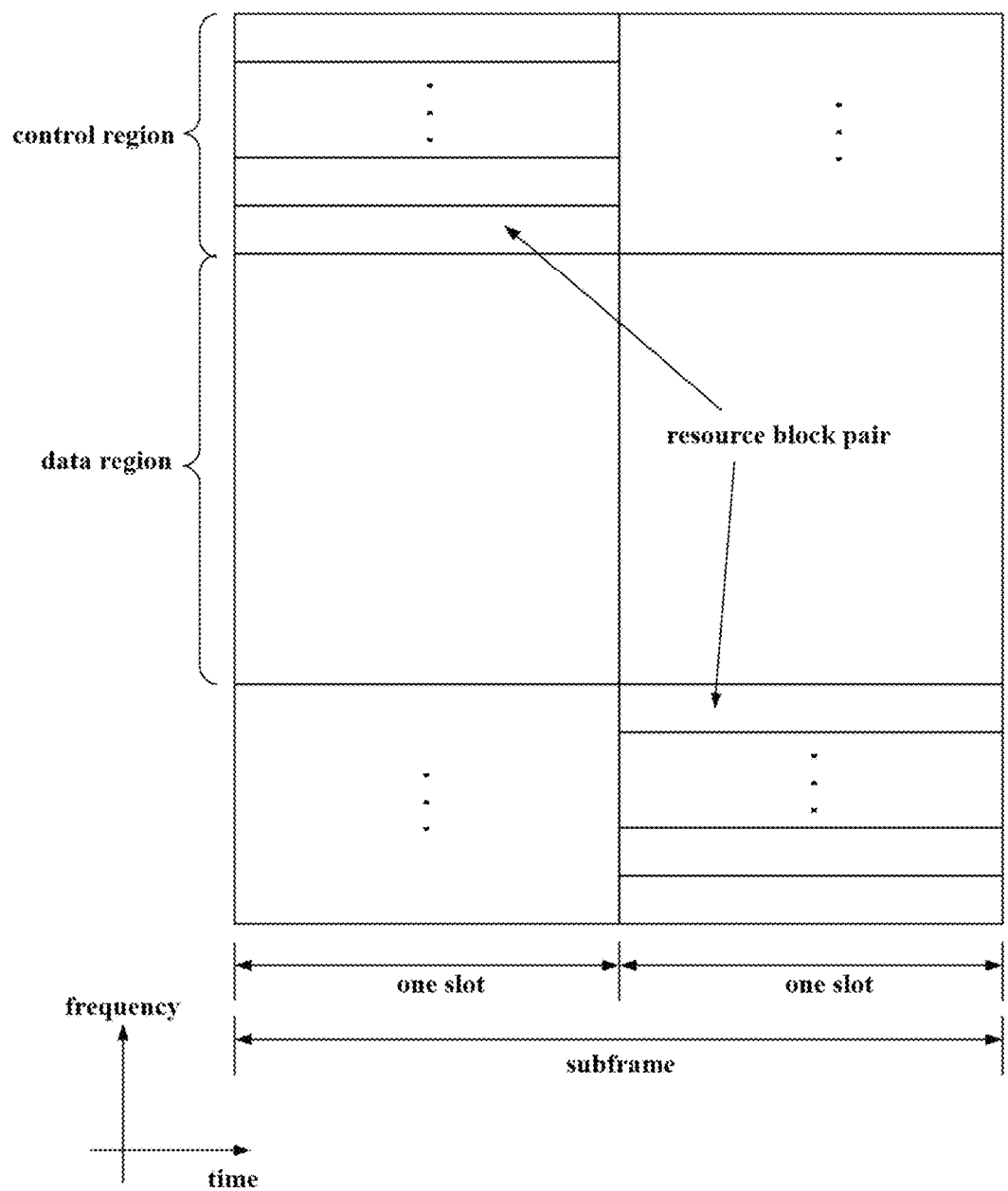
FIG. 5 is a diagram illustrating the structure of an uplink subframe.

FIG. 5 is a diagram illustrating the structure of an uplink subframe.

An uplink subframe can be partitioned into a control region and a data region in the frequency domain.

A physical uplink control channel (PUCCH) which includes uplink control information may be allocated to the control region, while a physical uplink shared channel (PUSCH) which includes user data may be allocated to the data region.

In order to maintain a single carrier property, a user terminal can selectively transmit a PUCCH and a PUSCH.

A PUCCH for a user terminal may be allocated to a resource block pair (RB pair) in the subframe.

The resource blocks belonging to a resource block pair may occupy different subcarriers in the two slots; this is referred to as the resource block pair allocated to the PUCCH frequency hopping at the slot boundary.

While FIG. 2A through FIG. 5 illustrate the case of LTE using OFDM for convenience, the descriptions are not limited to the physical channel structures of OFDM or LTE and can be applied to various waveform technology such as FBMC (filter-bank multi-carrier), GFDM (generalized frequency division multiplexing), UFMC (universal filtered multi-carrier), etc., for example, or to a system in which one or more waveforms coexist, as well as other forms of physical channel structures.

Figure 6:
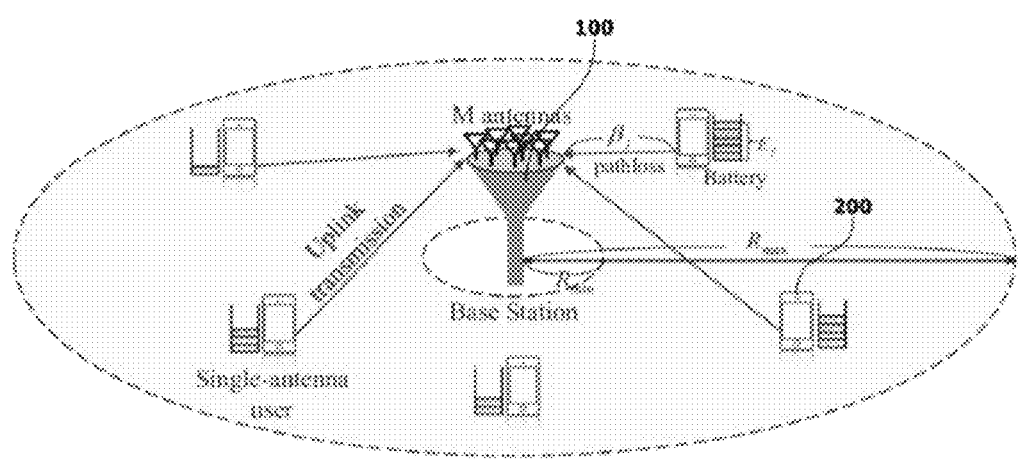
FIG. 6 is a diagram illustrating a mobile communication system according to an embodiment of the invention.

FIG. 6 is a diagram illustrating a mobile communication system according to an embodiment of the invention.

A mobile communication system according to an embodiment of the invention can be based on a massive MIMO environment and can include multiple base stations, multiple user terminals, and a network entity.

Incidentally, the network entity can be implemented as an arbitrary node of a base station or core network, and can determine uplink/downlink user scheduling by using information collected from the base stations.

Also, each base station can have at least one serving cell. If it is set for carrier aggregation, in which case several different frequency bands are aggregated and used as a single frequency band, then one base station can be set to have multiple serving cells.

For example, a base station can be set to have one primary cell and one or more secondary cells.

For the sake of convenience, FIG. 6 illustrates a case that includes one base station 100 and multiple user terminals 200 desiring scheduling with the base station 100, where multiple user terminals 200 perform unlinking to the base station 100 simultaneously.

The base station 100 can acquire long-term or large-scale fading information (hereinafter referred to as 'large-scale fading information') of user terminals 200 present within the serving cell by using physical uplink shared channel (PUSCH) signals received from the user terminal 200.

Here, each user terminal 200 can use a non-orthogonal, unique reference signal as the PUSCH signal.

The 'large-scale fading information' can also refer to average channel information in the long term.

Incidentally, in a massive MIMO environment, the greater the number of antennas of the base station 100, the more negligible are the channel fluctuations between the user terminals 200 and the antennas of the base station 100. That is, by using the large-scale fading information of a channel between a user terminal 200 and a base station 100 antenna, it is possible to predict the performance of the channel.

This can be ascertained by the equation of favorable propagation used for transmission and reception in a massive MIMO environment.

$$\frac{1}{M} G_l G_l^H \stackrel{M \gg K}{=} D_l \qquad \text{[Equation 1]}$$

Here, M is the number of antennas of the base station 100, K is the number of user terminals 200, $G_l$ is a K×M matrix representing the channel between the l-th antenna of the base station 100 and the user terminal 200, and $D_l$ is a diagonal matrix of which the (k, k)-th element is $\beta_{lk}$.

Also, $\beta_{lk}$ is the large-scale fading or average channel power between theIL-th antenna of the base station 100 and the k-th user terminal 200.

Incidentally, $G_l$ includes both small-scale fading and large-scale fading between the antenna of the base station 100 and the user terminal 200.

Equation 1 above shows that the greater the number of antennas of the base station 100, the more negligible the fluctuations in the channels between the user terminals 200 and the base station 100 antennas.

In other words, it is possible to predict the performance of a channel between a base station 100 antennas and a user terminal 200 from the large-scale fading information of the channel.

Incidentally, since the base station 100 acquires large-scale fading information by using PUSCH signals, it is not necessary to receive additional reference signals or feedback from the user terminals 200 for acquiring the large-scale fading information.

Also, the base station 100 can acquire available energy information of the user terminals 200.

Here, 'available energy' refers to the energy that can be used per resource element (RE) by the user terminal 200 for accessing the base station 100.

Incidentally, the available energy can change according to the battery state or charging process of the user terminal 200 or according to the power consumption policy of the user terminal 200, but such changes are extremely small or negligible when considering long terms.

Also, using the large-scale fading information and the available energy, the base station 100 can classify the user terminals 200 located within the serving cell into a multiple number of scheduling groups and set the uplink transmission power that is to be used for each of the scheduling groups.

User terminals 200 that belong to the same scheduling group may use the same uplink transmission power.

Here, the base station 100 can determine the allocation proportions of transmission power for reference signals and data signals for each user terminal 200 belonging to the same scheduling group.

Also, the base station 100 can determine the resource element usage proportion for each scheduling group based on the data rate of each scheduling group.

Here, the data rate and the resource element usage proportion may be inversely proportional. That is, from the multiple number of scheduling groups, a scheduling group having a relatively higher data rate may use a relatively lower proportion of resource elements compared to those scheduling groups having lower data rates.

Afterwards, the base station 100 can set the uplink scheduling period for each scheduling group, and according to the uplink scheduling period thus set, can allocate (the number of) resource elements for each scheduling group.

Afterwards, the base station 100 can broadcast scheduling information to the user terminals 200 present in the serving cell, where the scheduling information may include information on the scheduling groups to which the user terminals belong, information on the resource elements allocated to the corresponding scheduling groups, and information on uplink power (including the proportions for reference signals and data signals), and the user terminals 200 can transmit the reference signals and data signals according to the scheduling information received from the base station 100.

Here, the user terminals 200 can decide whether or not to use the resource elements allocated to the scheduling group to which it belongs according to the scheduling information received from the base station 100.

In the existing scheduling method, the allocation of resources is performed at the same time as the base station 100 provides scheduling information to the user terminals 200, so that the user terminals 200 had no choice but to use the resources allocated to themselves according to the scheduling received from the base station 100.

With a scheduling scheme according to an embodiment of the invention, however, a user terminal 200 can directly decide whether or not to use the resource elements allocated to the scheduling group it belongs to (This is referred to as being 'grant free'.). Thus, a user terminal 200 does not have to use the resource elements, i.e. the resources scheduled by the base station 100.

Also, in existing mobile communication systems, including those that use LTE (long-term evolution), predicting the performance of a channel between a user terminal 200 and a base station 100 antenna is inevitably very difficult or very inaccurate, due to channel fluctuations between the user terminal and the base station antenna.

Thus, with a user scheduling scheme for a mobile communication system according to the related art, the user scheduling first has to perform the process of acquiring accurate channel information if the user is to be guaranteed high quality of service, and due to the inherent property of the channel changing within short durations of time in a mobile communication environment, a process of transmitting reference signals in short periods for the scheduling is inevitably required.

With this type of scheduling scheme based on the related art, however, the user terminals 200 may send uplink reference signals before the scheduling, so that numerous uplink reference signals may be needed, and the spectral efficiency of the overall mobile communication system may be decreased. Moreover, as the channel information of user terminals for which scheduling was not performed is either not retained or not utilized, the energy efficiency of the user terminals 200 may be lowered.

Also, the transmissions follow the sequence of uplink-→downlink→uplink, so that there may occur two uplink/downlink transmission conversions, and such conversions may cause considerable delays in the context of TDD (time-division duplexing) or FDD (frequency-division duplexing).

Thus, to resolve the problems found in the related art described above, an embodiment of the present invention may use the large-scale fading information of a channel between a user terminal 200 and a base station 100 antenna, so that the procedure of transmitting reference signals in short periods for scheduling is no longer necessary, and may have the data rate 'maintained at a constant value' for all user terminals 200 located within the serving cell, so that there are no user terminals 200 that have not been scheduled. This can not only reduce delays caused by repeated uplinks and downlinks but also can enhance the spectral efficiency of the system and the energy efficiency of the user terminals.

Figure 7:
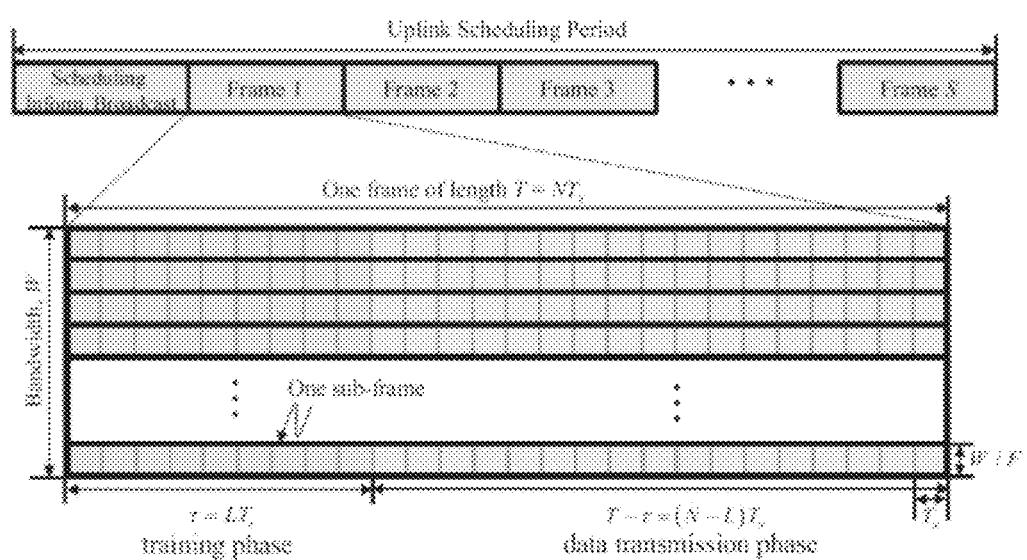
FIG. 7 is a diagram illustrating the structure of a frame used during an uplink scheduling according to an embodiment of the invention.

FIG. 7 is a diagram illustrating the structure of a frame used during an uplink scheduling according to an embodiment of the invention.

An uplink frame according to an embodiment of the invention can include a SIB (scheduling information broadcast) part, associated with the control by which the base station 100 provides the scheduling information to the user terminals 200 within the serving cell, and a multiple number of frames for the reference signals and data signals transmitted by the user terminals 200 to the base station 100.

In one example, a frame for a system using OFDMA can be composed of multiple resource elements that each occupies a unit time-frequency.

Here, a frame can be composed of multiple subframes, and a subframe can be composed of multiple resource elements.

The resource elements included in a subframe can be allocated to one or more of the scheduled user terminals 200, and a user terminal 200 can be allocated with one or more subframes, i.e. multiple resource elements.

In FIG. 7, a frame is composed of a total of NW/F resource elements, where one subframe is composed of a total of N resource elements.

Incidentally, the resource elements forming a subframe can be allocated to reference signals and data signals.

Adjacent resource elements can be used for transmitting reference signals, and their positions may not be fixed and can be fluidly modified.

Resource elements allocated to a reference signal can transmit a reference signal that has been agreed beforehand between the base station 100 and the user terminal 200 at a designated position.

Figure 8:
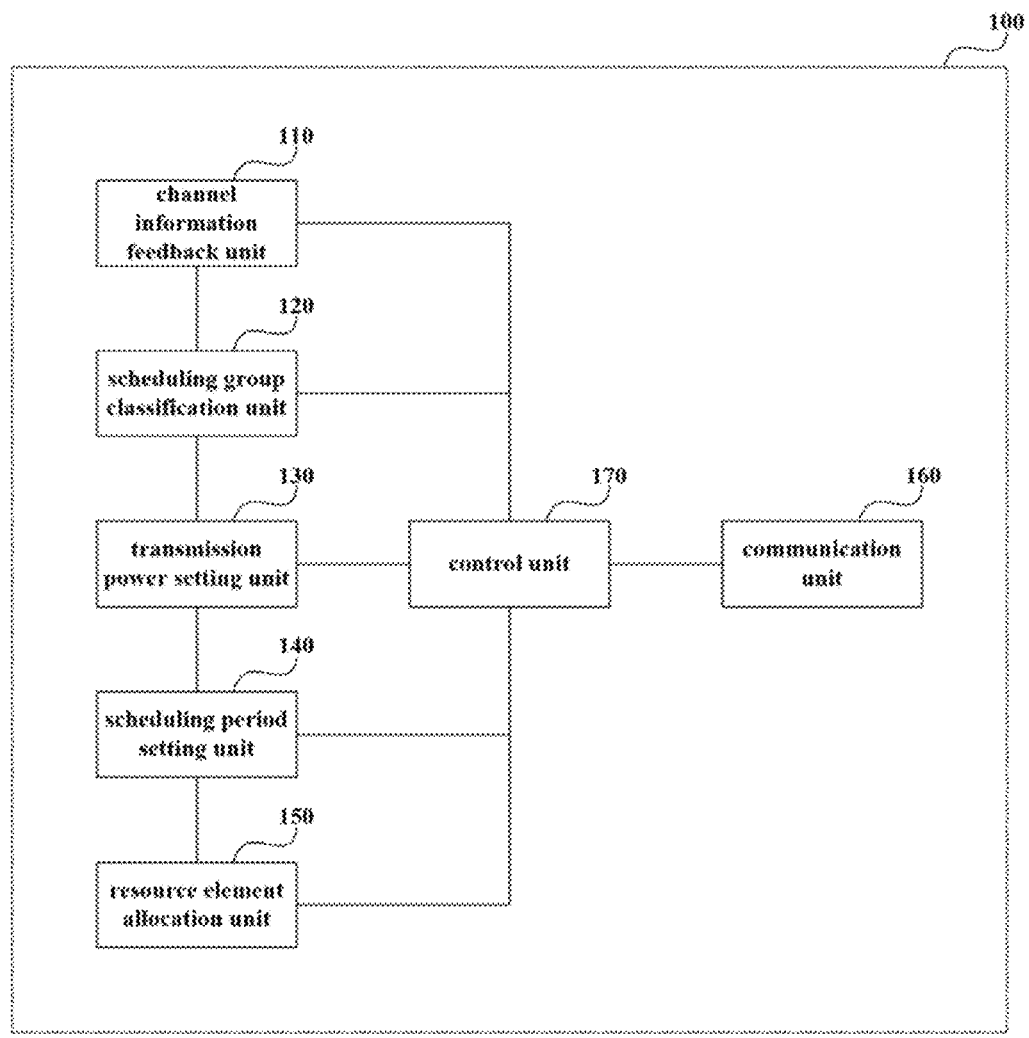
FIG. 8 is a block diagram illustrating the composition of an uplink scheduling apparatus according to an embodiment of the invention.

FIG. 8 is a block diagram illustrating the composition of an uplink scheduling apparatus according to an embodiment of the invention.

An uplink scheduling apparatus according to an embodiment of the invention can be included within the base station 100 or can exist as an apparatus that exists separately from the base station 100 to be connected to the base station 100.

The following describes an example in which the uplink scheduling apparatus is included within the base station 100, so that the uplink scheduling apparatus is expressed as the base station 100.

A base station 100 according to an embodiment of the invention can include a channel information feedback unit 110, a scheduling group classification unit 120, a transmission power setting unit 130, a scheduling period setting unit 140, a resource element allocation unit 150, a communication unit 160, and a control unit 170.

Considering each component, the channel information feedback unit 110 can acquire the large-scale fading information, i.e. the average channel information in the long term, of the user terminals 200 by using the PUSCH signals received from the user terminals 200.

Here, the large-scale fading information can be calculated by using Equation 2 shown below.

$$\beta = \frac{1}{PT}\sum_{i=1}^{T} \text{received\_signal}[t] \quad \text{[Equation 2]}$$

Here, P is the uplink transmission power, and the index t represents the index of a resource element.

The scheduling group classification unit 120 can classify the many user terminals 200 located within the serving cell into a multiple number of scheduling groups.

Here, the scheduling group classification unit 120 can classify the user terminals 200 such that those user terminals 200 of which the products ($\beta$E) of the large-scale fading information ($\beta$) and the available energy (E) are smaller than or equal to a preset threshold value belong to the same scheduling group.

In one example, the scheduling group classification unit 120 can order the user terminals 200 from largest to smallest $\beta$E and can sequentially compare the $\beta$E values between the user terminal having the largest $\beta$E value and the other user terminals, such as by comparing a first user terminal with a second user terminal, the first user terminal with a third user terminal, the first user terminal with a fourth user terminal, and so on, so as to classify the user terminals 200 such that those user terminals 200 of which the differences between the products are smaller than or equal to a preset threshold belong to the same scheduling group.

Thus, in the same scheduling group, the difference in $\beta$E values between the user terminal having the largest $\beta$E value and the user terminal having the smallest $\beta$E value is smaller than or equal to a preset threshold value.

Incidentally, '$\beta$E' may be a parameter representing the quality of a received signal, and for instance, can be a parameter that represents the data rate.

Also, the scheduling group classification unit 120 can further take into account the transmission probabilities of the user terminals 200 when classifying the user terminals 200 into scheduling groups as described above.

Here, the 'transmission probability' can represent the probability of using the resource elements as a result of the user terminal 200 deciding according to the scheduling of the base station 100 whether or not to use the allocated resource elements, i.e. the resources allocated according to the scheduling.

This is so that a greater number of user terminals 200 may be included in a scheduling group.

The transmission power setting unit 130 can set the uplink transmission power for each scheduling group.

Here, the uplink transmission power can be determined such that user terminals 200 that belong to the same scheduling group have the same uplink transmission power.

To this end, the transmission power setting unit 130 can determine the uplink transmission power that is to be used for each user terminal 200 and, for each scheduling group, can set the uplink transmission power for the corresponding scheduling group based on the user terminal 200 having the smallest uplink transmission power.

Also, the transmission power setting unit 130 can determine the allocation proportions of the uplink transmission power for the reference signals and data signals for each user terminal 200 of the same scheduling group.

Here, the transmission power setting unit 130 can determine the allocation proportions for the reference signals and data signals such that a maximum SINR (signal-to-interference-plus-noise ratio) is obtained.

For this, the scheduling group classification unit 120 can use Equation 3 shown below.

$$p_j^{tr,*}, p_j^{dt} = \left(\frac{u^*(O_q)}{\beta_j}, \frac{E_K\beta_K - Lu(O_q)}{(N-L)\beta_j}\right), \text{ for } j \in O_q, \quad \text{[Equation 3]}$$

$$u^a(O_q) =$$

$$\begin{cases} \left(\sqrt{1+\frac{a_{K,L}}{b_{K,L}}\frac{a_{K,L}e_{K,L}}{b_{K,L}c_{K,L}}} - 1\right), & \text{if } b_{K,L}d_{K,L} - a_{K,L}e_{K,L} \neq 0, \\ \frac{a_{K,L}}{2b_{K,L}}, & \text{if } b_{K,L}d_{K,L} - a_{K,L}e_{K,L} = 0, \end{cases}$$

Here, $p^{tr}$ and $p^{dt}$ represent the proportions of the uplink transmission power for the reference signal and data signal, respectively, K is the index of the user terminal 200 having the smallest $\beta$E value within scheduling group O, L is the number of resource elements occupied by reference signals, and O represents the scheduling group (for example, $O_q$ represents scheduling group q).

The values of a through e can be determined according to an algorithm used at the base station 100, and in one example where a ZF (zero-forcing) receiver or MRC (maximum ratio combining) receiver is used, the values of a through e can be determined as in Table 1 shown below.

TABLE 1

| Values | ZF Receiver | MRC Receiver |
|---|---|---|
| $^aK, L$ | $L (M - K) E_K\beta_K$ | $L (M - 1) E_K\beta_K$ |
| $^bK, L$ | $L^2(M - K)$ | $L^2(M - 1)$ |
| $^cK, L$ | $KE_K\beta_K + N - L$ | $KE_K\beta_K + N - L$ |
| $^dK, L$ | $(N - L - K) L + (K - L)^+ c_{K,L}$ | $\max\{L, K\} c_{K,L} - KL - LE_K\beta_K$ |
| $^eK, L$ | $KL(K - L)^+$ | $L(K \max\{L, K\} - L)$ |

Here, $(x)^+ = \max\{x, 0\}$.

The scheduling period setting unit 140 can set the usage proportion of resource elements for each scheduling group.

Here, the usage proportion of resource elements for each scheduling group can be set based on the data rate of each scheduling group, where the data rate can be represented as '$\beta$E' mentioned above.

Here, '$\beta$E' may be a parameter representing the quality of a received signal, and for instance, can be a parameter that represents data rate.

Incidentally, the data rate and the resource element usage proportion may be inversely proportional. That is, from the multiple number of scheduling groups, a scheduling group having a relatively higher data rate may use a relatively lower proportion of resource elements compared to those scheduling groups having lower data rates.

For example, if the ratio of data rates for scheduling groups A and B is 3:1, then the ratio of resource elements allocated for scheduling groups A and B may be 1:3.

Thus, as the scheduling period setting unit 140 adjusts the usage proportions of resource elements according to the proportions of data rates, the different data rates of the user terminals 200 may be made the same.

Afterwards, the scheduling period setting unit 140 can determine the 'data rate expected for all user terminals 200' present within the serving cell.

The 'data rate expected for all user terminals' may refer to the data rate with which the data rates of all user terminals 200 are 'maintained at a constant value' such that there is no user terminal 200 that is not scheduled from among the user terminals 200 located within the serving cell.

In the descriptions that follow, the 'data rate expected for all user terminals' is referred to as 'SE (common spectral efficiency)', and the scheduling period setting unit 140 can calculate the SE using Equation 4 shown below.

$$SE = \frac{1 - \frac{L}{N}}{\eta} \frac{1}{\sum_{i=1}^{Q} \Omega_j^{-1}}$$ [Equation 4]

Here, $\Omega_i$ is the data rate value of a user terminal 200 included in the i-th scheduling group, and $\eta$ is a value that represents the inefficiency of the bandwidth where $\eta = WT_s/F \geq 1$, W is the bandwidth of the resource elements, $T_s$ is a time segment, N is a symbol at $T_s$, and F represents the subframe in the frame.

The scheduling period setting unit 140 can use the SE calculated above to set the scheduling period (D) for each scheduling group.

Here, a 'scheduling period' may refer to the interval of the SIB (scheduling information broadcast) used by the base station 100 for providing the scheduling information to user terminals 200 present within the serving cell, or in other words, the number of resource elements scheduled at once.

Here, the scheduling period setting unit 140 can calculate the scheduling period for each scheduling group by using Equation 5 shown below.

$$D = \frac{T_{th}}{WSE}$$ [Equation 5]

Here, W is the bandwidth of the resource elements, and $T_{th}$ is a quality of service (QoS) parameter representing the volume size of data (voice communication or data communication, etc.) desired for each service category.

The resource element allocation unit 150 may allocate (the number of) resource elements to each scheduling group in accordance to the scheduling period of each scheduling group set by the scheduling period setting unit 140.

The communication unit 160 can receive PUSCH signals for acquiring large-scale fading information from the user terminals 200, and can transmit scheduling information, which may include the scheduling group information, information on the resource elements to be used by each group, and information on the uplink transmission power to be used by each group as set by the units described above, to the user terminals 200 via a broadcast channel.

The control unit 170 can provide the control according to which the aforementioned units 110-150 may perform the operations described above.

Figure 9:
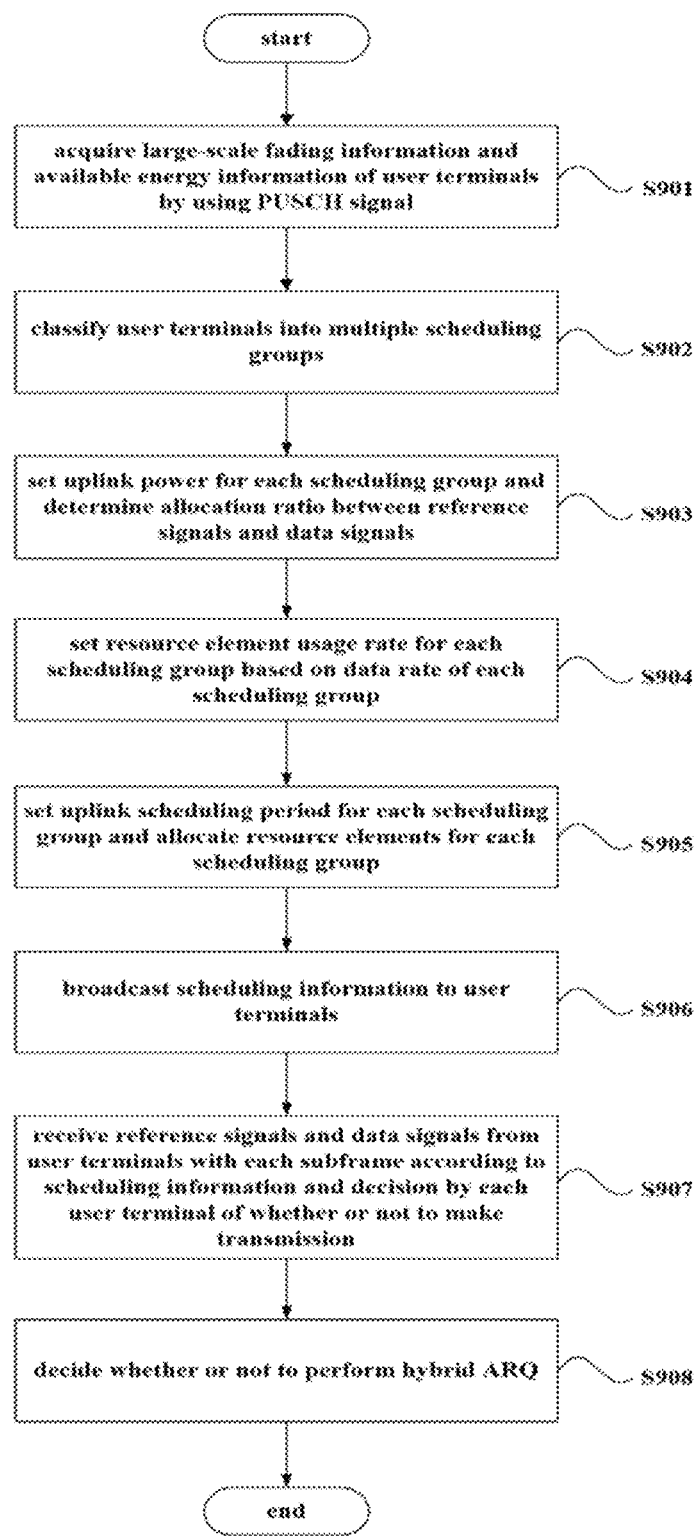
FIG. 9 is a flow diagram illustrating an uplink scheduling procedure according to an embodiment of the invention.

FIG. 9 is a flow diagram illustrating an uplink scheduling procedure according to an embodiment of the invention.

The base station 100 may acquire the large-scale fading information and available energy information of the user terminal 200 by using the PUSCH signals received from the user terminals 200 (operation S901).

As mentioned above with reference to Equation 1, in a massive MIMO environment, a greater number of antennas of the base station 100 means the channel fluctuations between the user terminals 200 and the antennas of the base station 100 become more negligible, and by using the large-scale fading information of a channel between a user terminal 200 and a base station 100 antenna, it is possible to predict the performance of the channel.

After operation S901, the base station 100 may classify the user terminals 200 located within the serving cell into a multiple number of scheduling groups by using the large-scale fading information and the available energy (operation S902).

After operation S902, the base station 100 may set the uplink transmission power for each scheduling group and determine the allocation proportions of the uplink transmission power for reference signals and data signals (operation S903).

Here, when the uplink transmission power is set for each scheduling group, the user terminals 200 belonging to the corresponding scheduling group would use the same uplink transmission power.

After operation S903, the base station 100 may set a resource element usage proportion for each scheduling group based on the data rate of each scheduling group (operation S904).

After operation S904, the base station 100 may set the uplink scheduling period for each scheduling group and may allocate (the number of) resource elements for each scheduling group according to the set uplink scheduling period (operation S905).

After operation S905, the base station 100 may broadcast the set scheduling information to the user terminals 200 (operation S906).

Here, the scheduling information can include scheduling group information regarding the scheduling groups to which the user terminals 200 belong, resource element information regarding the resource elements allocated to the corresponding scheduling groups, and uplink power information (including proportions for reference signals and data signals).

After operation S906, each user terminal 200 can decide whether or not to make a transmission with the resource elements allocated by the scheduling information, and the base station 100 may receive reference signals and data signals from the user terminals 200 according to the scheduling information and the decisions of the respective user terminals 200 on whether or not to make transmissions (operation S907).

After operation S907, the base station 100 may determine whether or not to perform a hybrid ARQ (automatic repeat request) according to whether or not the data signals received from the user terminals 200 are properly decoded (operation S908).

Figure 10:
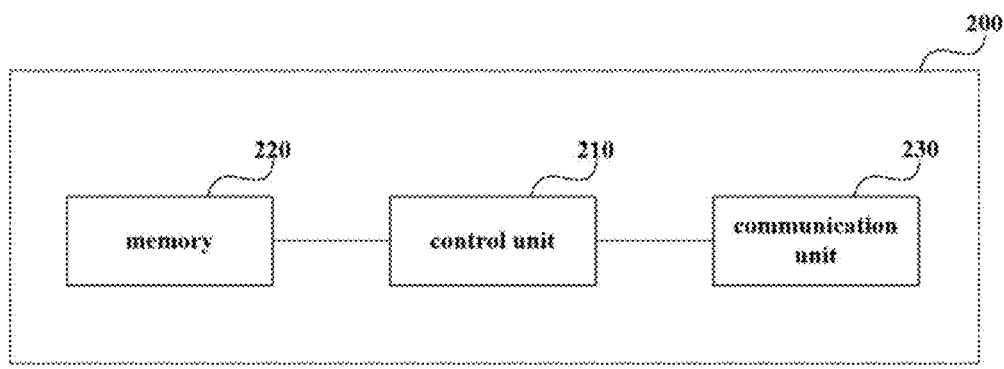
FIG. 10 is a block diagram illustrating the composition of a user terminal according to an embodiment of the invention.

FIG. 10 is a block diagram illustrating the composition of a user terminal according to an embodiment of the invention.

A user terminal 200 according to an embodiment of the invention can include a control unit 210 which may be a processor, a memory 220 connected with the control unit 210, and a communication unit 230.

Considering each component, when the scheduling information from the base station 100 is received via the communication unit 230, the control unit 210 can decide whether or not to use the resource elements allocated to the scheduling group it belongs to.

Here, the scheduling information received from the base station 100 can include information on the scheduling group to which the user terminal 200 belongs and the resource elements and uplink transmission power allocated to the scheduling group.

If it decides to use the resource elements (grant free), the control unit 210 can transmit reference signals and data signals with the allocated uplink transmission power by using the allocated resource elements together with other user terminals of the scheduling group to which the user terminal belongs, in accordance to the received scheduling information, to the base station 100 by way of the communication unit 230.

The memory 220 can be connected with the control unit 210 and can store program instructions that can be executed by the control unit 210 to perform the operations described above.

The communication unit 230 can receive the scheduling information from the base station 100 or transmit reference signals and data signals to the base station 100 in accordance to the control provided by the control unit 210.

Figure 11:
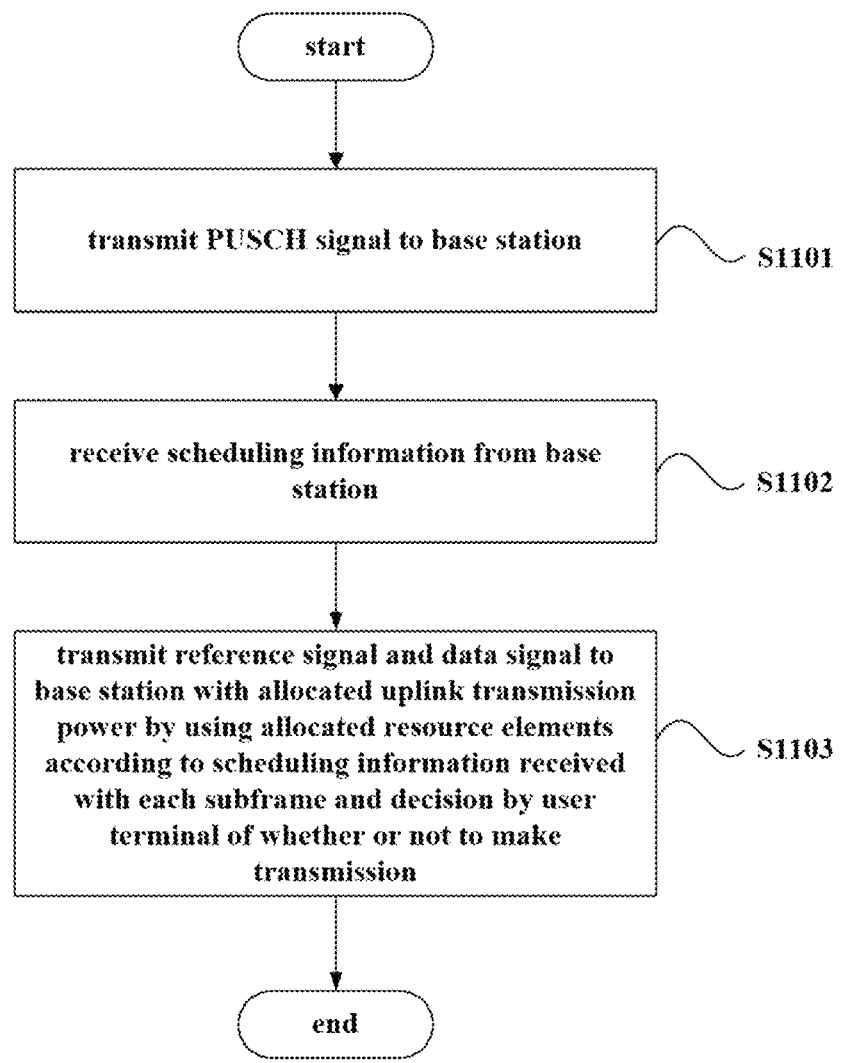
FIG. 11 is a flow diagram illustrating the operation of a user terminal according to an embodiment of the invention.

FIG. 11 is a flow diagram illustrating the operation of a user terminal according to an embodiment of the invention.

FIG. 11 is a flow diagram illustrates a procedure by which a user terminal 200 present in the serving cell of a base station in a massive MIMO environment communicates with the base station 100 according to the scheduling of the base station 100.

The user terminal 200 may transmit a PUSCH signal to the base station 100 (operation S1101)

After operation S1101, the user terminal 200 may receive scheduling information from the base station 100 (operation S1102).

Here, the scheduling signal received from the base station 100 can include information on the scheduling group to which the user terminal 200 belongs and the resource elements and uplink transmission power allocated to the scheduling group.

After operation S1102, the user terminal 200 can decide, at each subframe, whether or not to make a transmission using the allocated resource elements in accordance to the received scheduling information, and if a decision is made to make a transmission, may transmit reference signals and data signals to the base station 100 with the allocated uplink transmission power and by using the allocated resource elements together with the other user terminals of the scheduling group it belongs to (operation S1103).

Figure 12:
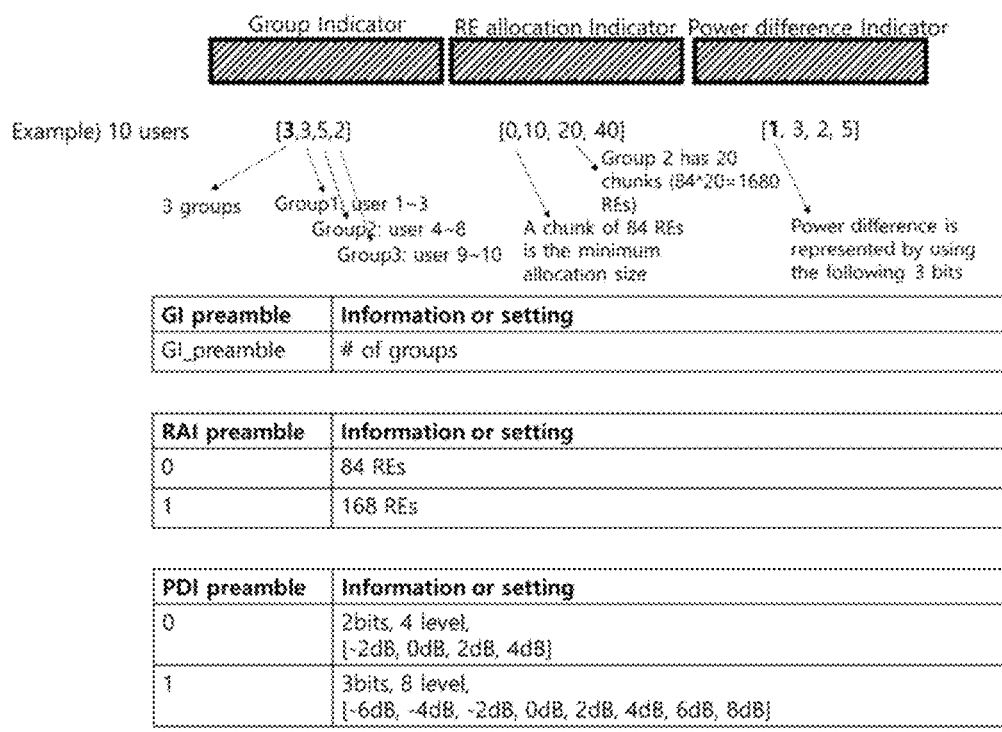
FIG. 12 is a diagram illustrating the composition of scheduling information according to an embodiment of the invention.

FIG. 12 is a diagram illustrating the composition of scheduling information according to an embodiment of the invention.

A piece of scheduling information according to an embodiment of the invention can include one or more of information on the scheduling groups (Group Indicator), information on resource elements allocated for each scheduling group (RE Allocation Indicator) and information on the uplink transmission power set for each scheduling group (Power Difference Indicator).

Here, 'information on the scheduling groups' may be information regarding which scheduling group a user terminal belongs to and can convey the number of groups and the number of user terminals belonging to each group.

In the example illustrated in FIG. 12, eleven user terminals present in a serving cell have been classified into three scheduling groups, where the user terminals belonging to each group are shown.

Incidentally, the information on the scheduling groups also shows the sizes of the sets, i.e. the indexes of the user terminals, for which the indexes of the user terminals can be ordered according to RSS (received signal strength).

That is, user terminal A having the greatest RSS can be assigned Index No. 1.

$$RSS_a \geq RSS_b \geq RSS_c$$
$$\downarrow \quad \downarrow \quad \downarrow$$
$$User\,1 \quad User\,2 \quad User\,3$$

Thus, during the cell connection process, the following procedures can be performed between the base station 100 and the user terminals 200.

When a new user terminal is connected, the base station 100 may broadcast the RSS of the corresponding user terminal via a downlink, and the user terminals 200 present in the cell can each compare the received RSS with its own RSS and subsequently increase its user index by 1 if the received RSS is greater and maintain its current user index if the received RSS is smaller.

If a user terminal previously present within the cell leaves the cell, the base station 100 may broadcast the user index of the corresponding user terminal via a downlink, and the user terminals 200 present in the cell can each decrease the user index by 1 if the received user index is smaller than its own user index and maintain its current user index if the received user index is greater.

The changes in user indexes performed at the user terminals 200 as described above may be transmitted to the base station 100, enabling the base station 100 to keep track of the user index of each user terminal 200.

Also, the 'information on resource elements allocated for each scheduling group' can represent the number of resource elements used by the corresponding scheduling group.

In the example illustrated in FIG. 12, the number of allocated resource elements is shown for each scheduling group.

It can be seen that Scheduling Group 1 has been allocated 10 chunks, where one chunk includes 84 resource elements, Scheduling Group 2 has been allocated 20 chunks, and Scheduling Group 3 has been allocated 40 chunks.

Incidentally, the '0' marked at the front in the information regarding resource elements denotes the minimum number of resource elements forming a chunk, meaning that a chunk is composed of 84 resource elements.

If it is marked '1', then the number of resource elements forming a chunk would be 168.

Also, the 'information on the uplink transmission power set for each scheduling group' can represent the power difference between data signals and reference signals, i.e. the allocation proportions of uplink transmission power for the data signals and reference signals.

In the example illustrated in FIG. 12, the power differences are shown for the respective scheduling groups, and the '1' marked at the front in the information regarding uplink transmission power denotes the number of bits representing the power difference, with 0 denoting 2 bits and 1 denoting 3 bits.

Figure 13:
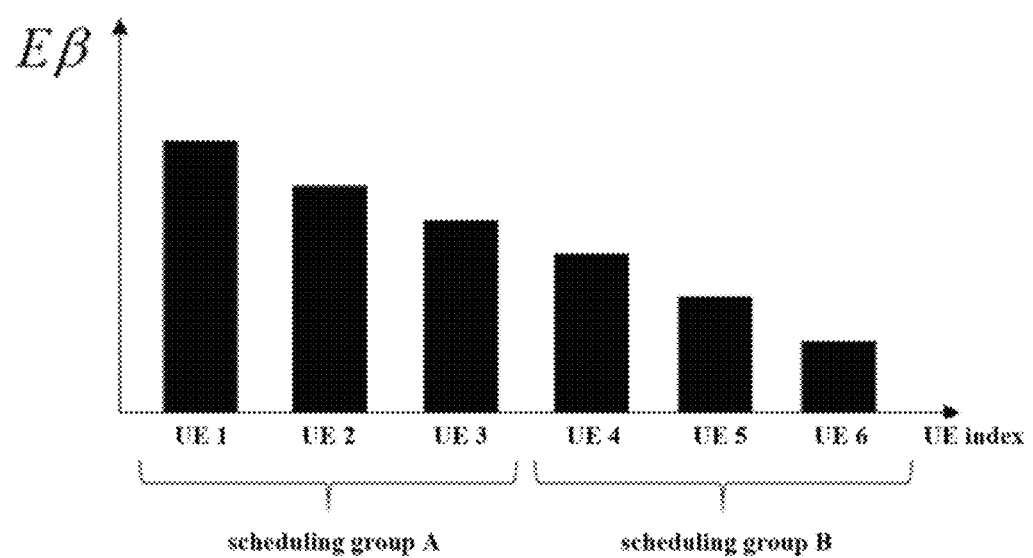
FIG. 13 is a diagram illustrating a classification of scheduling groups according to an embodiment of the invention.

FIG. 13 is a diagram illustrating a classification of scheduling groups according to an embodiment of the invention.

The base station 100 may order the user terminals 200 located in the serving cell, i.e. UE 1 to UE 6, from largest to smallest βE and may sequentially compare the βE values between UE 1 and UE 2, UE 1 and UE 3, UE 1 and UE 4, and so on.

As a result of the comparisons, UE 1 to UE 3, of which the differences in βE values are smaller than or equal to a preset threshold value, can be classified as Scheduling Group A.

Afterwards, the βE values may be compared sequentially between UE 4 and UE 5 and between UE 4 and UE 6, and as a result of the comparisons, UE 4 to UE 6, of which the differences in βE values are smaller than or equal to a preset threshold value, can be classified as Scheduling Group B.

Here, the difference in βE values between the user terminal having the largest βE value and the user terminal having the smallest βE value is smaller than or equal to a preset threshold value in each of the scheduling groups.

Figure 14:
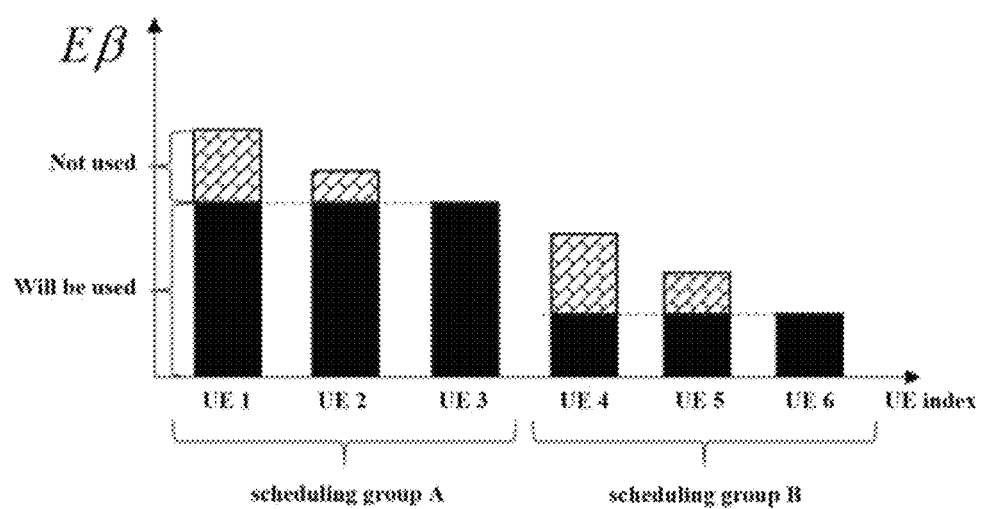
FIG. 14 is a diagram illustrating a setting of uplink transmission power for scheduling groups according to an embodiment of the invention.

FIG. 14 is a diagram illustrating a setting of uplink transmission power for scheduling groups according to an embodiment of the invention.

In the example illustrated in FIG. 14, the user terminals have been classified into Scheduling Groups A and B according to the method illustrated in FIG. 13, and in setting the uplink transmission power for each scheduling group, the user terminal having the smallest available power in each scheduling group can be used as the basis.

That is, in Scheduling Group A, the power of UE 3 may be used as the uplink transmission power for the corresponding scheduling group, whereas in Scheduling Group B, the power of UE 6 may be used as the uplink transmission power for the corresponding scheduling group.

Here, the surplus power that remains unused in UE 1 and UE 2 of Scheduling Group A and in UE 4 and UE 5 of Scheduling Group B can be used during the next round of scheduling.

According to another embodiment of the invention, the classifying into scheduling groups can be based on predetermined QoS groups rather than all user terminals. For example, the required QoS may differ according to the service or application used by the user terminals, and a QoS group can be a group of user terminals that require the same QoS. Thus, according to another embodiment of the invention, user terminals that require the same QoS can be divided into QoS groups beforehand, and each of the QoS groups can be classified as a scheduling group.

Furthermore, in an embodiment of the invention, a procedure of determining the length of a reference signal can be included in the scheduling. In an embodiment of the invention, a user terminal that has been allocated resource elements may directly decide whether or not to use the resource elements. In this case, the base station would ascertain whether or not a particular user terminal will use resource elements by way of a reference signal, but if the reference signal is not set to have an appropriate length, it may not be possible to accurately detect whether or not the allocated resource elements are to be used.

In consideration of this, an embodiment of the invention may entail determining the length of a reference signal based on the required transmission success probability and on a false alarm probability. Here, the false alarm probability represents the probability of a reference signal not being recognized as having been transmitted even though the reference signal has been transmitted.

The description of the present invention provided above is illustrative; it is to be appreciated that a person of ordinary skill in the field of art to which the invention pertains can easily provide modifications implemented in specific forms without departing from the technical spirit of the invention or altering the essential features of the invention.

Thus, it should be understood that the embodiments disclosed in the foregoing are illustrative in all aspects and do not limit the scope of the present invention.

For example, an element described as having an integrated form can be implemented in a distributed form, and likewise, an element described as having a distributed form can be implemented in an integrated form.

The scope of the invention is to be defined by the scope of claims provided below, and all variations or modifications that can be derived from the meaning and scope of the claims as well as their equivalents are to be interpreted as being encompassed within the scope of the present invention.

What is claimed is:

1. A scheduling apparatus comprising:
a scheduling group classification unit configured to classify user terminals located within a serving cell of a base station into a plurality of scheduling groups by using products of large-scale fading information of the user terminals and available energy information of the user terminals;
a transmission power setting unit configured to set a transmission power of the user terminals for each of the classified scheduling groups so that the user terminals in a same scheduling group use same transmission power;
a scheduling period setting unit configured to set a scheduling period for each of the scheduling groups based on a resource element usage proportion for each of the scheduling groups, the resource element usage portion being determined based on a data rate of each of the scheduling groups and
a resource element allocation unit configured to allocate a number of resource elements used for each of the scheduling groups according to the respectively determined scheduling period,
wherein the allocated resource elements are provided to the user terminals for the user terminals decision whether or not to use the allocated resource elements,
wherein the scheduling group classification unit compares the products of the large-scale fading information and the available energy information to classify cases having a difference smaller than or equal to a predetermined threshold value into a same scheduling group,
such that a difference in the products of the large-scale fading information and the available energy information between a user terminal having a largest product and a user terminal having a smallest product is smaller than or equal to a predetermined threshold value.

2. The scheduling apparatus of claim 1,
wherein the scheduling group classification unit classifies the user terminals into the plurality of scheduling groups further taking into account transmission probabilities of the user terminals,
wherein the transmission probability refers to a probability of using the resource elements as a result of the decision of whether or not to use the allocated resource elements by each user terminal of the same scheduling group.

3. The scheduling apparatus of claim 1, wherein the transmission power setting unit sets the transmission power based on a user terminal of which the product of the large-scale fading information and the available energy information is smallest from among the user terminals belonging to each of the scheduling groups, wherein the user terminals belonging to a same scheduling group use a same transmission power.

4. The scheduling apparatus of claim 3, wherein the transmission power setting unit determines allocation proportions of the transmission power for reference signals and data signals for each user terminal belonging to each of the scheduling groups.

5. The scheduling apparatus of claim 4, wherein the transmission power setting unit determines the allocation proportions for the reference signals and the data signals such that a maximum SINR (signal-to-interference-plus-noise ratio) is obtained.

6. The scheduling apparatus of claim 1, wherein the scheduling period is calculated by using a volume size (QoS) of data requested for each service category, a bandwidth of resource elements, and a data rate expected for all of the user terminals.

7. The scheduling apparatus of claim 6, wherein the scheduling period is proportional to the volume size of data requested for each service category and is inversely proportional to the bandwidth of the resource elements.

8. The scheduling apparatus of claim 1, further comprising: a communication unit configured to broadcast scheduling information according to the determined scheduling period, the scheduling information including information on one or more of the scheduling groups (group indicators), the transmission power (power difference indicator) for each of the scheduling groups, and the allocated resource elements.

9. The scheduling apparatus of claim 1, wherein the scheduling group is determined for each predetermined QoS group, wherein the QoS group is a group formed for terminals requiring a same QoS.

10. The scheduling apparatus of claim 1, wherein the scheduling apparatus is configured to determine a length of a reference signal to be allocated to each of the user terminals based on a transmission success probability and a false alarm probability, wherein the false alarm probability is a probability of a reference signal not being recognized as having been transmitted even though the reference signal has been transmitted.

11. A scheduling method for a scheduling apparatus, the scheduling method comprising:
(a) classifying user terminals located within a serving cell of a base station into a plurality of scheduling groups by using products of large-scale fading information of the user terminals and available energy information of the user terminals;
(b) setting a transmission power of the user terminals for each of the classified scheduling groups so that the user terminals in a same scheduling group use same transmission power;
(c) setting a scheduling period for each of the scheduling groups based on a resource element usage proportion for each of the scheduling groups, the resource element usage portion being determined based on a data rate of each of the scheduling groups; and
(d) allocating a number of resource elements used for each of the scheduling groups according to the respectively determined scheduling period;
wherein the user terminals having the resource elements allocated thereto directly decide whether or not to use the allocated resource elements,
wherein the products of the large-scale fading information and the available energy information of the user terminals are compared, and cases having a difference smaller than or equal to a predetermined threshold value are classified into a same scheduling group,
wherein a difference in the products of the large-scale fading information and the available energy information between a user terminal having a largest product and a user terminal having a smallest product is smaller than or equal to a predetermined threshold value.

12. The scheduling method of claim 11, further comprising:
(e) broadcasting scheduling information according to the determined scheduling period, the scheduling information including information on one or more of the scheduling groups (group indicators), the transmission power (power difference indicator) for each of the scheduling groups, and the allocated resource elements.

13. The scheduling method of claim 11, wherein said step (a) comprises:
classifying the user terminals into the plurality of scheduling groups further taking into account transmission probabilities of the user terminals,
wherein the transmission probability refers to a probability of using the resource elements as a result of the deciding of whether or not to use the allocated resource elements by each user terminal of the same scheduling group.

14. The scheduling method of claim 11, wherein the scheduling group is determined for each predetermined QoS group, wherein the QoS group is a group formed for terminals requiring a same QoS.

15. The scheduling method of claim 11, further comprising: determining a length of a reference signal to be allocated to each of the user terminals based on a transmission success probability and a false alarm probability, wherein the false alarm probability is a probability of a reference signal not being recognized as having been transmitted even though the reference signal has been transmitted.

16. A system for a user terminal of communicating with a base station according to a scheduling by the base station, the system comprising:
a processor;
a memory connected to the processor; and
a communication unit connected to the processor,
wherein the memory stores program instructions executable by the processor for performing procedures of:
transmitting a physical uplink shared channel (PUSCH) signal to the base station by way of the communication unit,
determining whether or not to use an allocated resource element upon receiving scheduling information from the base station by way of the communication unit, the scheduling information including information on a scheduling group to which the user terminal belongs and the resource element and transmission power allocated to the scheduling group, and
transmitting a reference signal and a data signal to the base station with the allocated transmission power by using the allocated resource element together with other user terminals belonging to the scheduling group according to the received scheduling information, if as a result of the deciding it is decided that the allocated resource element is to be used,
wherein the scheduling group is classified using products of large-scale fading information of user terminals served by the base station and available energy information of the user terminals served by the base station, and wherein the transmission power is set for each of the classified scheduling groups so that user terminals in a same scheduling group use same transmission power,
wherein the products of the large-scale fading information and the available energy information of the user terminals are compared, and cases having a difference smaller than or equal to a predetermined threshold value are classified into a same scheduling group,
wherein a difference in the products of the large-scale fading information and the available energy information between a user terminal having a largest product and a user terminal having a smallest product is smaller than or equal to a predetermined threshold value.

17. A method for a user terminal of communicating with a base station according to a scheduling by the base station, the method comprising:
   (a) transmitting a physical uplink shared channel (PUSCH) signal to the base station;
   (b) receiving scheduling information from the base station, the scheduling information including information on a scheduling group to which the user terminal belongs and a resource element and transmission power allocated to the scheduling group; and
   (c) transmitting a reference signal and a data signal to the base station with the allocated transmission power by using the allocated resource element together with other user terminals belonging to the scheduling group according to the received scheduling information,
   wherein the scheduling information is generated based on large-scale fading information acquired by the base station by using the physical uplink shared channel signal, wherein the scheduling group is classified using products of large-scale fading information of user terminals served by the base station and available energy information of the user terminals served by the base station,
   wherein the products of the large-scale fading information and the available energy information of the user terminals are compared, and cases having a difference smaller than or equal to a predetermined threshold value are classified into a same scheduling group,
   wherein a difference in the products of the large-scale fading information and the available energy information between a user terminal having a largest product and a user terminal having a smallest product is smaller than or equal to a predetermined threshold value,
   wherein said step (c) includes deciding whether or not to use the allocated resource element, and
   wherein, the transmission power is set for each of the classified scheduling groups so that user terminals in a same scheduling group use same transmission power.

* * * * *